Figures 1, 2, 3, 4, 5, 6:
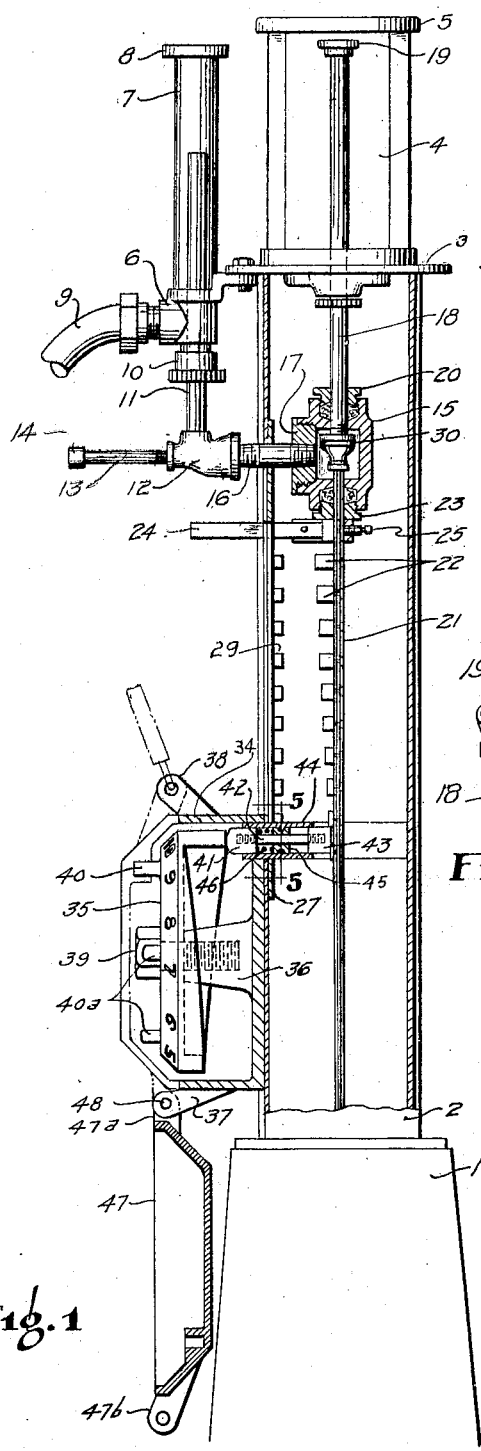

July 1, 1930. A. J. GORLICK 1,769,504

LIQUID VENDING APPARATUS

Filed Nov. 10, 1927

INVENTOR
Andrew J. Gorlick
BY
ATTORNEY

Patented July 1, 1930

1,769,504

UNITED STATES PATENT OFFICE

ANDREW J. GORLICK, OF CLEVELAND, OHIO

LIQUID-VENDING APPARATUS

Application filed November 10, 1927. Serial No. 232,338.

This invention relates to an improvement in liquid vending apparatus, and is particularly applicable to the vending machine as shown in my pending application Ser. No. 133,193, filed September 2nd, 1926, and Patent No. 1,672,254, dated June 5, 1928.

The object of the present device is to provide a combined sight gage or indicator and well, to prevent siphoning or sucking of additional liquid as the liquid is delivered to the purchaser. In the present device the measuring receptacle or container for the liquid delivers into a glass cylinder or well to which the delivery pipe is connected and from which the liquid is discharged. The connection between the measuring receptacle and the glass cylinder includes a sliding pipe which works through the bottom of the glass cylinder and which is adjusted according to the adjustment of the pipe in the measuring receptacle which controls the amount of liquid delivered. When the liquid flows out through the delivery hose it empties the cylinder and thereby breaks the vacuum and prevents any siphoning action which would draw additional liquid out of the measuring well.

The device also eliminates the raising and lowering of the delivery hose as in the machine forming the subject of the former application, the hose being connected or supported in a fixed position. The glass cylinder enables it to be seen when the liquid flows and when it stops.

The invention is particularly useful for gasoline delivery apparatus.

One form of the invention is shown in the accompanying drawing, in which Fig. 1 is an elevational view of the dispensing apparatus partly in section; Fig. 2 is a vertical sectional view of the upper part of same; Fig. 3 is a partial elevation of the sliding door hereinafter described, and Fig. 4 is a perspective view of a special pipe fitting used inside the housing. Fig. 5 is a section on line 5—5 of Fig. 1. Fig. 6 is a detail in perspective of an outlet valve.

In the drawings, 1 is the base enclosing the pump mechanism, 2 is the body of the apparatus terminating in a flange 3 in which is mounted the glass receptacle or measuring tank 4 with cover top 5 forming a leak proof container for the liquid. The flange 3 also carries the bracket 6 into which fits a glass cylinder 7, and the loosely fitting cover top 8. The delivery hose 9 from the cylinder 7 is fastened to this bracket by suitable means, as is also the packing gland 10 thru which a pipe 11 screwed to a T 12 slides. The T 12 carries at its outer end pipe 13 terminating in pipe cap 14 forming a handle, the uses of which will be hereinafter described. The other end of T 12 is connected to a housing 15 by means of a nipple 16 and bushing 17. A pipe 18 terminating in a valve 19 slides thru packing gland 20 on top of housing 15 and a rod 21 having lugs 22 fastened to it passes thru gland 23 at the bottom of the housing 15. It will be noted that each succeeding lug projects ⅛ inch further from rod 21 than its predecessor. A lever 24 is fastened to rod 21 by set screw 25 and passes thru slot 26 in door 27. Door 27 has a round hole 28 thru which nipple 16 passes and an elongated hole 26$^a$ for the casting 44 and has a series of lugs 29 along one side which engage with a counting device described in my said patent, said counting device having a spring actuated arm adapted to be engaged and register for each of said lugs 29 which pass downwardly past said arm, said arm adapted to not actuate said counting device when said lugs 29 pass in the opposite direction.

Rod 21 and pipe 18 are screwed into special fitting 30 which has two apertures 31 thru which the liquid may pass.

Reservoir 4 is filled by supply pipe 32 to a predetermined level after which any excess liquid is drained back into the supply tank thru pipe 33.

Attached to the lower part of the body of the apparatus is a casting 34 which forms a housing for the control cam and dial 35. Cast integrally with the housing is a central boss 36 and ears 37 and 38. The cam dial 35 is cylindrical in section having a web with a hole in it at one end by which means it is mounted rotatably on screw 39 which screws into boss 36 of casting 34. The open end of the cylinder is shaped to form a cam which has a gradual and uniform drop, the increment of which correspond with the lugs on measuring stick 21. Lugs 40 and 40ª are cast integrally with the cam 35 and provide a means of rotating same.

A cam follower 41 is connected by means of stud 42 to lock bar or stop 43 which engages with the lugs on the measuring stick 21. Follower 41 may be adjusted in or out by means of the thread on stud 42 and it slides in the casting 44 which is fastened to the body 2 of the apparatus. Casting 44 has lugs 44ª and 44ᵇ cast integrally with it which engage in a groove cut in block 45. Block 45 is a cylinder with a groove cut in its periphery and has two flat sides, the width between said flat sides being slightly less than the distance between the two lugs 44ª and 44ᵇ. Block 45 is inserted with its parallel flat surfaces between lugs 44ª and 44ᵇ until the groove in its cylindrical surface is in line with said lugs and it is then turned 90° and the lugs engage in the groove. Stud 42 slides in a hole in the center of block 45. A spring 46 retained between follower 41 and block 45 tends to keep the follower in contact with the cam and to lock block 45 to casting 44.

A cover 47 having appendages 47ª and 47ᵇ is hinged at 48 by means of ear 47ª to housing 34.

In operation the attendant seizes the handle 13 and raises the rod 21 to the highest point. The pump is then started and the liquid is forced from the supply tank thru pipe 32 to reservoir 4 filling same to the level established by the overflow pipe 33. The attendant then moves cam plate 35 until the required amount of liquid to be withdrawn lines up with follower 41. Follower 41 being constantly pressed outward by the spring 46 withdraws lock bar 43 allowing measuring stick 21 and pipe 18 to be lowered to the correct level. The attendant then moves handle 24 horizontally in slot 26 in door 27 thereby rotating measuring stick 21, fitting 30 and pipe 18, the rotation of pipe 18 operating valve 19 and releasing liquid from reservoir 4. The opening of the valve 19 is produced by the angle arm 19ª, fixed thereto, contacting with the overflow pipe 33 as shown in Fig. 6. The valve comprises a hinged flap to which the angle arm is fixed. As the pipe 18 turns the arm 19ª contacts with the pipe 33 and automatically lifts the valve to open position, and it remains in that position until the attendant returns the pipe 18 to normal position which releases the arm 19ª from the pipe 33 and the valve 19 drops to closed position by its own weight. The liquid flows from reservoir 4 thru pipe 18, thru the apertures 31 in fitting 30 into housing 15, thence thru nipple 16, tee 12, pipe 11 into chamber 7 and thence thru delivery hose 9 to the customer. The overflow pipe 33 provides a vent for the tank 4, and a vent for a cylinder 7 is provided by the loose fit of cap 8.

When the desired amount of liquid is delivered the upper end of the pipe 11 is uncovered and the liquid all drains from the cylinder 7. This breaks the vacuum and prevents siphoning or excess flow from the tank 4, and the delivery is visible through the wall of the cylinder. When the liquid ceases to overflow the top of pipe 11 there is no suction which might cause more liquid to be drawn through said pipe, and the top of pipe 11 is lower than that of pipe 18 so that the difference of level will create a head to speed up the flow and said head is effective until the liquid level in tank 4 has been lowered to the top of pipe 18 after which all that will flow at reduced head is the small amount in pipe 18 between the two levels. This saves time in delivering the gasoline.

When it is desired to lock the apparatus for the night the pipe 18 and measuring stick 21 are raised the full extent of their travel namely to the filling and draining position. The pump lever is locked as explained in my pending application referred to above which operation also opens the drain valve thereby draining back to the supply tank any liquid that may remain in the reservoir 4. The cam 35 is then rotated until the pin 40, which is longer than pin 40ª, is at the top in which position it will engage a hole in the cover 47 which may be raised into position as shown by the dot and dash lines, and locked by means of a lock passed thru holes in the appendages 47ᵇ and 38. Said pin 40 is so located that when it is in said locking position the lock bar 43 is positioned to prevent the movement of the control mechanism from the drain position to a discharge position.

The invention is not limited to the particular form shown, but various modifications may be made within the scope of the following claims.

I claim:

1. The combination of a measuring tank, a measuring outlet pipe adjustable vertically therein, a receptacle beside the tank, a pipe communicating with said outlet pipe and adjustable therewith, in said receptacle, the open top of said pipes being at different levels, and an outlet pipe connected to said receptacle.

2. The combination with a measuring tank, and a vertically adjustable discharge pipe working through the bottom thereof, of an extension connected to said pipe and provided with graduated lugs, and a slidable stop adjustable to limit the movement of said extension and pipe by contact of the lugs therewith, and a cam dial working against the stop to adjust the same to desired position.

3. The combination with a measuring tank, and a vertically adjustable discharge pipe working through the bottom thereof, of an extension connected to said pipe and provided with graduated lugs, and a slidable stop adjustable to limit the movement of said extension and pipe by contact of the lugs therewith, the stop being slidable and spring-pressed outwardly, and a cam dial working against the stop to adjust the same inwardly.

4. The combination with a measuring tank, and a vertically adjustable discharge pipe working through the bottom thereof, of an extension connected to said pipe and provided with graduated lugs, and a slidable stop adjustable to limit the movement of said extension and pipe by contact of the lugs therewith, the stop being slidable, and a rotary dial having a cam edge bearing against the stop to advance the same to desired position to be engaged by a selected lug.

In testimony whereof I do affix my signature.

ANDREW J. GORLICK.